United States Patent
DePaso

(10) Patent No.: US 9,227,791 B2
(45) Date of Patent: Jan. 5, 2016

(54) CONVEYOR SYSTEM, BELT, AND METHOD USING ACCELEROMETERS

(75) Inventor: Joseph M. DePaso, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/882,686

(22) PCT Filed: Oct. 17, 2011

(86) PCT No.: PCT/US2011/056511
§ 371 (c)(1),
(2), (4) Date: Apr. 30, 2013

(87) PCT Pub. No.: WO2012/060999
PCT Pub. Date: May 10, 2012

(65) Prior Publication Data
US 2013/0220776 A1    Aug. 29, 2013

Related U.S. Application Data

(60) Provisional application No. 61/409,155, filed on Nov. 2, 2010.

(51) Int. Cl.
*B65G 47/00* (2006.01)
*B65G 43/00* (2006.01)
*B65G 43/02* (2006.01)

(52) U.S. Cl.
CPC ............... *B65G 43/00* (2013.01); *B65G 43/02* (2013.01)

(58) Field of Classification Search
CPC ................................ B65G 43/00; B65G 43/02
USPC ..................... 198/617, 832.2, 832.3
See application file for complete search history.

(56) References Cited

U.S. PATENT DOCUMENTS

| | | |
|---|---|---|
| 3,857,488 A | 12/1974 | Le Cren |
| 3,897,868 A | 8/1975 | Smith, Jr. |
| 5,699,897 A | 12/1997 | Svejkovsky |
| 6,112,166 A * | 8/2000 | Joosten ............... 702/185 |
| 6,237,752 B1 | 5/2001 | El-Ibiary |
| 6,308,822 B1 | 10/2001 | Moran et al. |
| 8,260,574 B1 * | 9/2012 | Schuitema et al. ........... 702/183 |
| 2005/0077152 A1 | 4/2005 | Pfarr et al. |
| 2005/0240376 A1 | 10/2005 | Uwatoko et al. |
| 2008/0006513 A1 | 1/2008 | Stolyar et al. |
| 2008/0287189 A1 | 11/2008 | Rabin |
| 2009/0194391 A1 | 8/2009 | Lagneaux |

* cited by examiner

*Primary Examiner* — William R Harp
(74) *Attorney, Agent, or Firm* — James T. Cronvich

(57) ABSTRACT

Conveying systems and method for measuring accelerations in a conveyor advancing through process equipment and taking remedial and prophylactic action in response. The conveyor system includes a conveyor with embedded accelerometers making measurements conveyor accelerations. A controller uses the measurements to control the speed of the conveyor to compensate for unwanted accelerations or to damp the unwanted accelerations. The controller can also use the measurements to warn of unwanted accelerations or to predict the failure of associated or nearby equipment so that maintenance can be scheduled and to detect imminent failures and shut down the process.

27 Claims, 5 Drawing Sheets

CONVEYOR SYSTEM, BELT, AND METHOD USING ACCELEROMETERS

BACKGROUND

The invention relates generally to power-driven conveyors conveying articles and more particularly to conveyor systems using accelerometers to measure the acceleration of a conveyor conveying articles.

One purpose of a conveyor, such as a conveyor belt, is to transport products or persons smoothly, either through a larger device or from one point to another in a manufacturing, logistic, or transport operation. Smooth, linear motion of the conveyor is important in many applications, such as, for example, transporting passengers, manufacturing extrusions, and conveying unstable products subject to tipping upright. But many variables cause the motion of conveyor belts not to be smooth. These variables include, but are not limited to, fluctuations in the belt's drive train, resonances in the conveyor belt, resonances in other coupled systems, and fluctuating loading caused by people walking over the surface of the belt. The fluctuations and resonances affect the conveyor belt's forward motion by causing speed changes, i.e., accelerations, which can jostle passengers, topple cans or bottles, or degrade a continuous manufacturing process. This problem is particularly evident in long conveyor systems because the accumulated elasticity of the long belt makes it difficult to control the belt's dynamic motion. In people movers, for example, as a passenger walks or moves about on top of the belt, his shifting foot weight sets up a periodic load that acts as a forcing function. The spring constant of the long belt allows the belt to expand and compress to a degree that is noticeable and objectionable to the passenger on the belt. The dynamic motion of the belt becomes problematic. While shifting foot weight is the cause of the forcing function in this example, long belts are more elastic and more subject to resonance. Thus, there is a need for smoothly moving conveyors.

All mechanical devices generate periodic accelerations due to the motion of components such as linkages, gears, chains, and pistons. Even uniformly rotating components, such as shafts, flywheels, and disks, generate periodic accelerations due to imbalance and run-out. Components such as roller bearings in larger devices also generate characteristic periodic accelerations. These accelerations or vibrations in one or more dimensions can be measured by accelerometers. Analyzing accelerometer data using methods such as Fourier analysis can isolate these various sources. As mechanical components wear, their frequency spectra and magnitudes change over time. This information can be used to predict failure trends and support planned maintenance. Traditionally, accelerometers are permanently affixed to devices or temporarily affixed using magnetic mounts, clips, or similar methods. Multiple accelerometers located throughout a mechanical device provide desirable local information of the device, but are prohibitive because of cost and physical constraints, such as mounting and routing of wires. Thus, there is a need for economically measuring and analyzing the wear characteristics of mechanical systems to predict failures.

SUMMARY

One version of a conveyor system embodying features of the invention comprises a conveyor conveying articles in a conveying direction and an accelerometer embedded in the conveyor to make measurements of accelerations of the conveyor.

In another aspect of the invention, a conveyor belt comprises an endless belt loop and an accelerometer embedded in the endless belt loop to make measurements of accelerations of the belt loop.

In yet another aspect of the invention, a method for measuring the acceleration of a conveyor comprises: (a) driving a conveyor having at least one embedded accelerometer in a conveying direction; and (b) making measurements of the acceleration of the conveyor with the at least one embedded accelerometer.

BRIEF DESCRIPTION OF THE DRAWINGS

These aspects and features of the invention are better understood by referring to the following description, appended claims, and accompanying drawings, in which:

DETAILED DESCRIPTION

Figure 1:
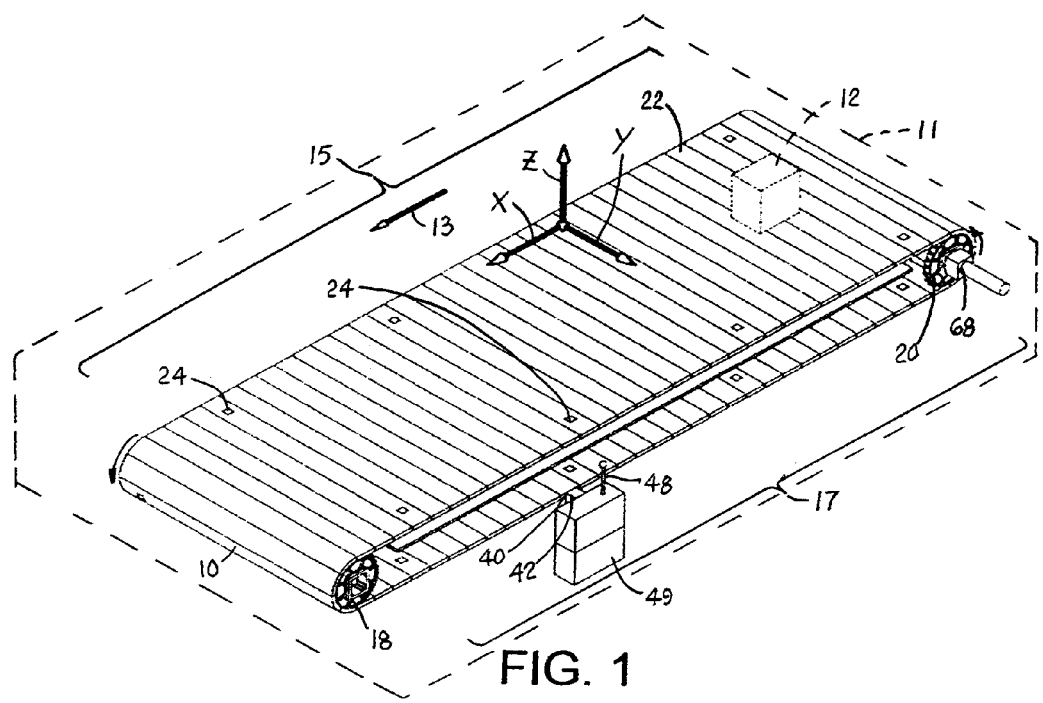
FIG. 1 is an isometric view of a conveyor system embodying features of the invention including accelerometers embedded in a moving conveyor.

One version of a conveyor system embodying features of the invention is shown in FIG. 1. A conveyor, shown in this example as a conveyor belt 10 supported on a carryway 60, carries articles 12 through a process 11 in a conveying direction 13 on an outer conveying surface 22 along a carryway segment 15 of the belt's endless conveying path. At the end of the carryway, the articles are conveyed off the conveyor belt. After rounding drive sprockets 18, the conveyor belt 10 follows a return segment 17 on its way back around idle sprockets 20 to the carryway segment 15. Both the drive and idle sprockets are mounted on shafts 68 (only idle shaft shown in FIG. 1).

One or more accelerometers 24 embedded in the belt 10 make measurements of accelerations in the belt. The term "embedded" is used in a broad sense to encompass any installation of an accelerometer in a conveyor. Examples of embedded accelerometers include accelerometers mounted on or in, molded into, inserted into, laminated in, welded to, bonded to, or otherwise rigidly connected to the advancing conveyor. The accelerometers 24 may be single-axis accelerometers sensing the component of local belt acceleration along an x-axis, for example, parallel to the conveying direction 13; a two-axis accelerometer sensing the components of acceleration along the x-axis and a y-axis perpendicular to the x-axis, for example, across the width of the conveyor belt; or a three-axis accelerometer sensing three orthogonal components of local acceleration, for example, along the x- and y-axes and along a z-axis extending through the thickness of the conveyor belt. In most applications, belt accelerations along the x-axis would be of most interest and more susceptible to control, but accelerations along the other axes may be of interest as well. For example, an accelerometer sensing accelerations along the z-axis, or even along the x-axis, could be used to detect the impact of an article dropped onto the conveyor belt. Examples of accelerometer technologies include piezoelectric, piezoresistive, and capacitive. For compactness, a micro-electro-mechanical-system (MEMS)-based accelerometer is useful. In FIG. 1, which shows a modular plastic conveyor belt loop constructed of rows of hinged modules, the accelerometers 24 are spaced apart regularly at locations along the length of the belt and across its width.

Figure 2:
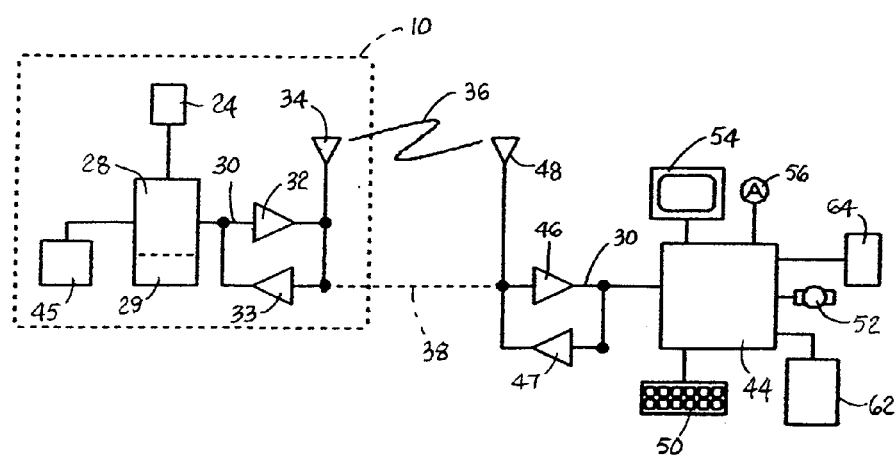
FIG. 2 is a block diagram of the conveyor system of FIG. 1.

As shown in FIG. 2, each accelerometer 24 is connected to a logic circuit 28 in the conveyor belt 10. Each logic circuit may be realized by a programmed microcontroller or by hardwired logic elements. Conventional signal-conditioning circuit components, such as buffers, amplifiers, analog-to-digital converters, and multiplexers, may be interposed between the accelerometer and the logic circuit. The logic circuit may also include a unique address or other identifying indicia to correlate the response of each accelerometer with a specific position on the conveyor belt. The identifying indicia and the accelerometer's measurements may be stored in one or more memory elements 29. The accelerometer measurements—one, two, or three components of acceleration—are converted into a measurement signal 30 that is transmitted remotely by a transmitter 32. The transmitter may be a wireless RF transmitter transmitting wirelessly via an antenna 34 over a wireless communication link 36 or over an ohmic connection 38 between a conductive contact 40 on the outside of the belt 10 and a brush 42 in conveyor structure along the side of the belt, as in FIG. 1. A receiver 33 may also be connected to the logic circuit to receive command and control signals from a remote controller 44, i.e., a controller not located on or in the conveyor belt. Other transmitter-receiver technologies, such as optical or infrared, for example, may be used. All the components embedded in the belt may be powered by a power source 45, such as one or more battery cells, housed together in a cavity in the belt. Alternatively, the power source 45 may be an energy harvester harvesting energy from vibratory motion or articulation of the conveyor, thermal gradients, or other energy-producing effects inherent in the process or conveyance. The embedded power source 45 may alternatively be powered by induction or by RF charging as it recirculates past an external charging device 49, as in FIG. 1.

A remote receiver 46 receives the measurement signal 30 via an antenna 48 over the wireless communication link 36 or over the ohmic connection 38 from the receiver 33 embedded in the conveyor belt. The receiver 46 sends the measurement signal to the remote controller 44. A transmitter 47 connected between the controller 44 and the antenna 48 or the ohmic connection 38 may be used to send command and control signals to the belt-borne accelerometer circuits. An operator input device 50 connected to the controller 44 may be used to select accelerometer or alarm settings or data to be displayed. The controller 44 may also be used to stop or control the speed of a motor 52 driving the main drive sprockets 18, to control intermediate drives 62, or to activate a damper 64 acting on the conveyor belt itself. A video display 54 may be used to monitor system operating conditions and settings or to display alarm conditions. A more clearly visible or audible alarm 56 may also be used by the controller to warn of irregularities in the process. The controller may be a programmable logic controller, a laptop, a desktop, or any appropriate computer device.

Figure 3:
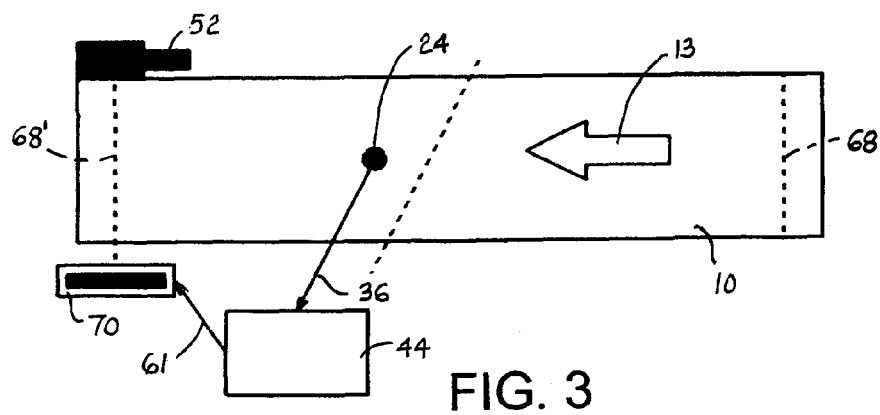
FIG. 3 is a top plan view of a conveyor system as in FIG. 1, further showing a rotational damper on the conveyor drive shaft operated in a closed-loop system.
Figure 4:
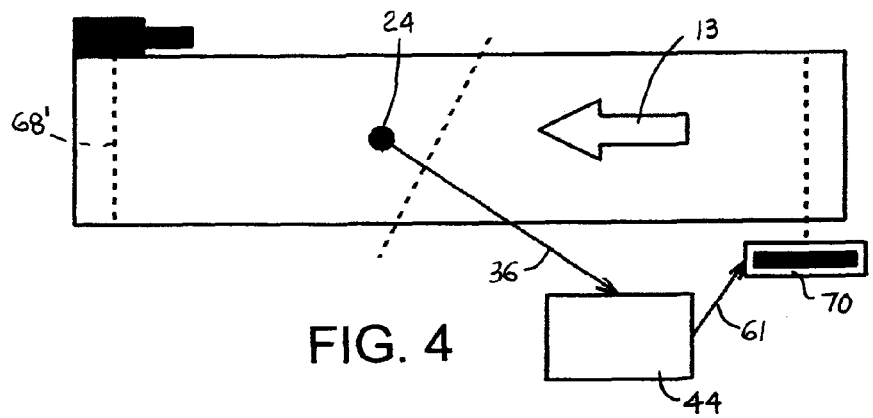
FIG. 4 is a top plan view of a conveyor system as in FIG. 1, further showing a rotational damper on the conveyor idle shaft operated in a closed-loop system.

As shown in FIG. 3, the accelerometer 24 embedded in the belt 10 is used to damp accelerations in the belt. Its measurements of acceleration 30 are routed over the communication link 36 to the controller 44. The controller, using wireless or copper control lines 61, applies damping to the drive shaft 68' of the conveyor in response to unwanted accelerations measured by the accelerometer. Damping is applied to the drive shaft by a rotational damper 70 controlled by the controller in a closed-loop control system to compensate for speed changes caused by vibrations, resonances, stick-slip, chordal action, imbalance, run-out, or other conditions causing regular or intermittent speed variations. FIG. 4 shows a similar closed-loop control system, except that the rotational damper 70 operates on the idle shaft 68 to apply damping, such as conventional speed-change damping, back tension, or controlled braking, at that point along the conveying path.

Figure 5A:
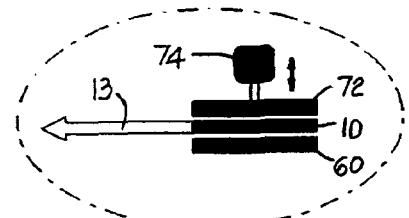
FIG. 5A is an enlarged view of the linear damper of FIG. 5.
Figure 5:
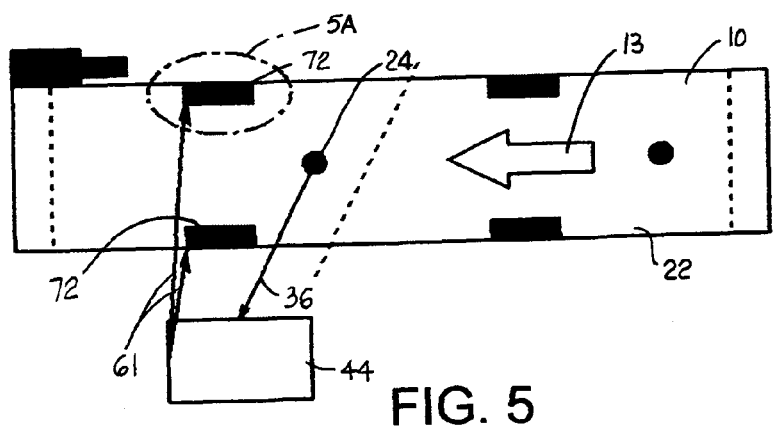
FIG. 5 is a top plan view of a conveyor system as in FIG. 1, further showing a linear damper operated in a closed-loop system.

FIGS. 5 and 5A depict linear damping applied to the conveyor belt 10 at positions along the carryway path 15. Acceleration measurements made by the accelerometers 24 are transmitted over the communications link 36 to the controller 44. Responding to the acceleration measurements, the controller activates linear dampers 72, which act directly on the conveyor belt 10. An actuator 74 associated with the linear damper 72 receives the control signal 61 from the controller to increase and decrease or otherwise modulate the pressure applied by the damper against the outer surface 22 of the conveyor belt 10. The linear damper 72, in the form of a movable pad, forms a clamp with the carryway 60 to apply a clamping force against the belt 10 and damp undesired accelerations. Like a modular plastic conveyor belt and a carryway, the clamping pad may be made of a viscoelastic material. The linear dampers can be applied intermittently along the carryway path segment 15.

Figure 6A:
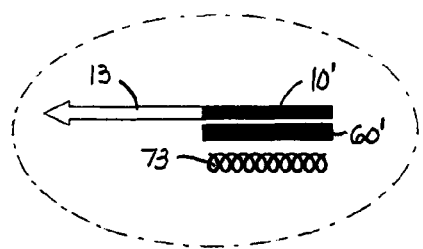
FIG. 6A is an enlarged view of the magnetic damper of FIG. 6.
Figure 6:
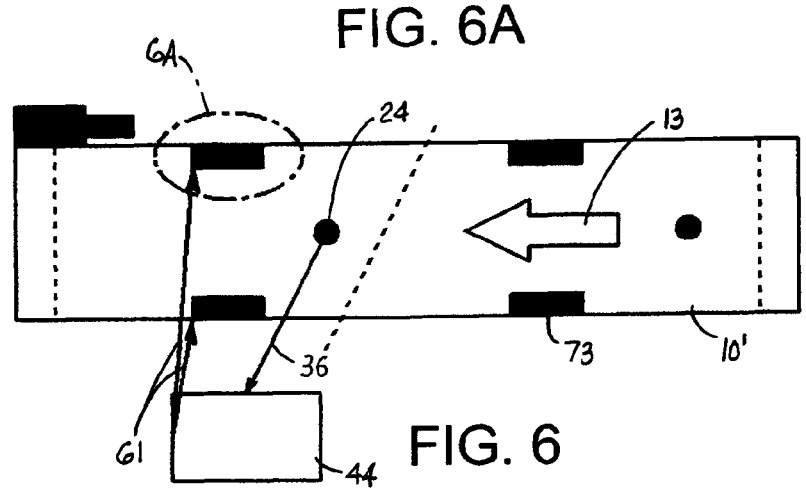
FIG. 6 is a top plan view of a conveyor system as in FIG. 1, further showing a magnetic damper operated in a closed-loop system.

FIGS. 6 and 6A depict a similar linear damping system using magnetic or electromagnetic forces. In this version, the belt 10', the carryway 60', or both are made of a viscoelastic material. The clamping force is accomplished using magnets 73, permanent or electromagnetic. Permanent magnets or electromagnets 73 outside the belt act on ferrous or other magnetically attractive materials or magnets inside the belt 10' to generate a clamping force between the belt and the carryway. Alternatively, ferrous or other magnetically attractive materials outside the belt act on permanent magnets or electromagnets inside the belt to generate a clamping force. The controller 44 modulates the electromagnetic force or the position of the fixed attractive material to obtain the desired damping characteristic.

Figure 7A:
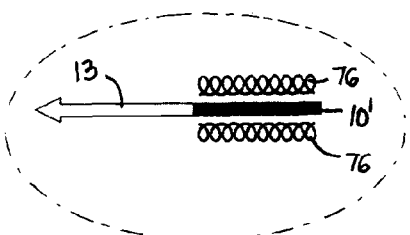
FIG. 7A is an enlarged view of the eddy-current damper of FIG. 7.
Figure 7:
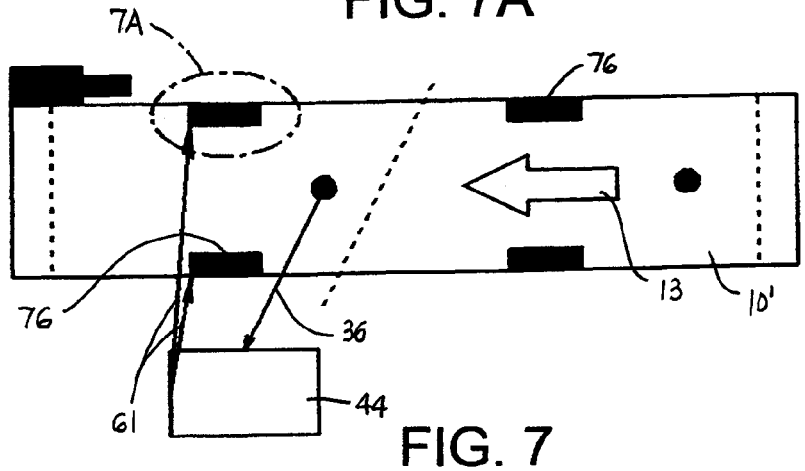
FIG. 7 is a top plan view of a conveyor system as in FIG. 1, further showing an eddy-current damper operated in a closed-loop system.

Another form of damping acting on the conveyor belt itself is shown in FIGS. 7 and 7A. In this version, the entire conveyor belt 10', or portions of it, are made of an electrically conductive material. Magnetic field generators 76 disposed along the length of the conveyor belt 10' produce a magnetic field through which the belt passes. Eddy currents are induced in the conductive portions of the belt. The eddy currents produce an induced magnetic field that, according to Lenz's law, opposes the direction of the motion causing the induced field, i.e., the motion of the belt in the conveying direction 13. Consequently, the interaction of the inducing and induced magnetic fields results in a damping force applied to the conveyor belt 10' opposite to the conveying direction 13. Thus, the magnetic field generators are eddy-current dampers. They may be permanent magnets whose distance from the belt may be controlled by the controller 44 to adjust the magnitude of the fields and the damping force or electromagnets whose field strength can be electronically controlled by the controller. A similar form of damping is realized by making the conveyor belt 10', or portions of it, out of a ferrous or magnetically attractive material. In this case, the magnetic field generators 76 disposed along the length of the conveyor belt 10' act on the ferrous or magnetically attractive materials in the belt to create a force generally opposing the motion of the belt and so providing damping.

Figure 8:
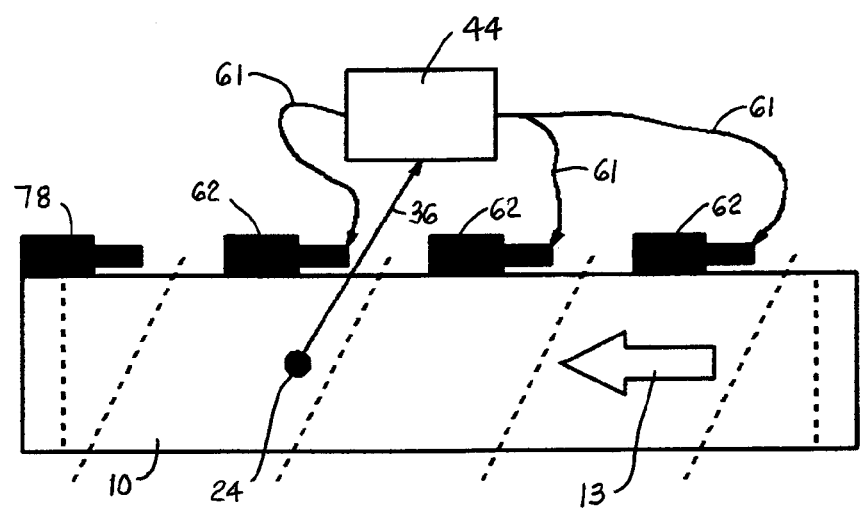
FIG. 8 is a top plan view of a conveyor system as in FIG. 1, further showing intermediate drives used as dampers in a closed-loop system.

In yet another version, shown in FIG. 8, the controller controls the operation of intermediate drives 62 engaged with the conveyor belt 10 at spaced apart positions along the carryway. The intermediate drives serve as dampers to damp unwanted belt accelerations. They can also serve as auxiliary drives to help the conveyor's main drive 78 advance the belt forward. This dual function is especially useful in long conveyors. The controller sends control signals 61 to each of the intermediate drives in response to acceleration measurements from the accelerometers 24 to damp unwanted accelerations in belt motion.

Figure 10:
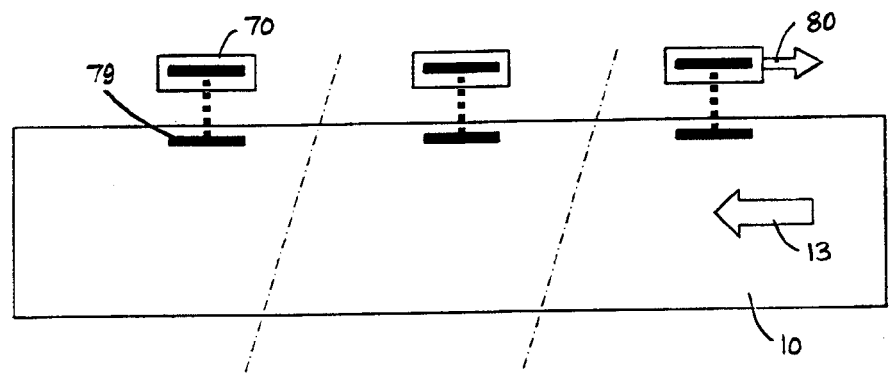
FIG. 10 is a top plan view of a conveyor system as in FIG. 1, further showing intermediate rotational dampers engaging the linear movement of the belt.

Intermediate rotational dampers converting the linear motion of the belt surface to rotational motion may be similarly used as in FIG. 10. In this example, the linear motion 13 of the belt 10 is converted to rotational motion via engagement with a circular engaging element 79, which may be a friction disk or a tire frictionally engaging the belt surface or a sprocket mechanically engaging mating drive structure in the belt. The circular engaging element 79 co-acts with an associated damper 70, which may provide viscous-fluid damping, eddy-current damping, magnetic damping, frictional damping, electric-motor damping, or regenerative damping with an electric generator providing power 80 back to the conveyor system.

Figure 9:
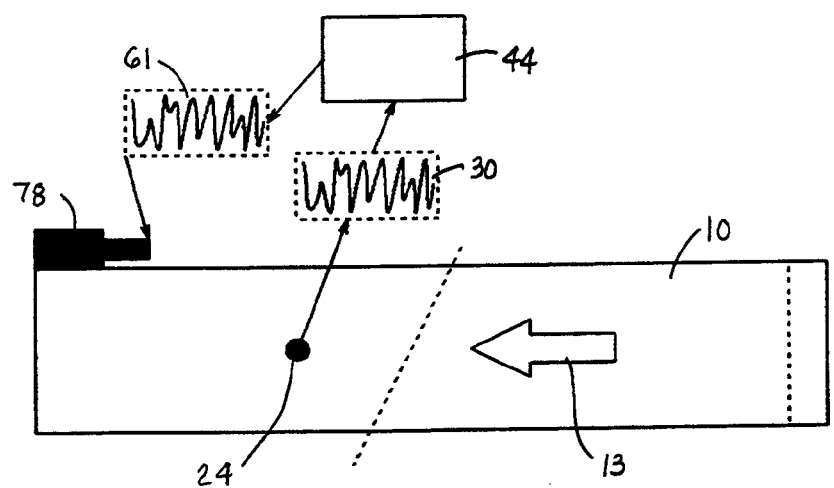
FIG. 9 is a top plan view of a conveyor system as in FIG. 1, further showing a controller directly controlling the speed of the drive motor in a closed-loop system.

In still another version, as shown in FIG. 9, the main conveyor drive 78 is controlled directly in response to the belt-acceleration feedback provided by the accelerometers 24. Thus, rather than controlling the damping of the belt's dynamic system, the system's forcing function, i.e., the belt drive 78, is controlled. Acceleration measurements 30 from the accelerometers 24 are transmitted to the controller 44 over the communications link 36. The controller produces a control signal 61 that compensates for the unwanted accelerations and applies the signal to the main drive 78, in this example, a variable-frequency motor drive.

With one or more accelerometers 24 embedded in a conveyor 10 advancing through process equipment 11 and nearby conveyor components as in FIG. 1, measurements of local accelerations in the conveyor caused by the devices can be made essentially continuously.

One moving accelerometer can be used to replace multiple stationary accelerometers and can provide finer-resolution data, which the controller 44 can use to perform failure-trend analysis of the process equipment in which the conveyor is installed and of other proximate devices, such as conveyor components, particularly at the infeed and discharge boundaries, and schedule the necessary maintenance. The controller can use the accelerometer-based data for protective control, such as shutting down the process, stopping the conveyor motor 52, or sounding alarms 56, as already described with reference to FIG. 2, if excessive vibration or other out-of-range speed fluctuations are sensed. In this way, the system provides both remedial and prophylactic protection of the conveyor system and the entire process.

Figure 11:
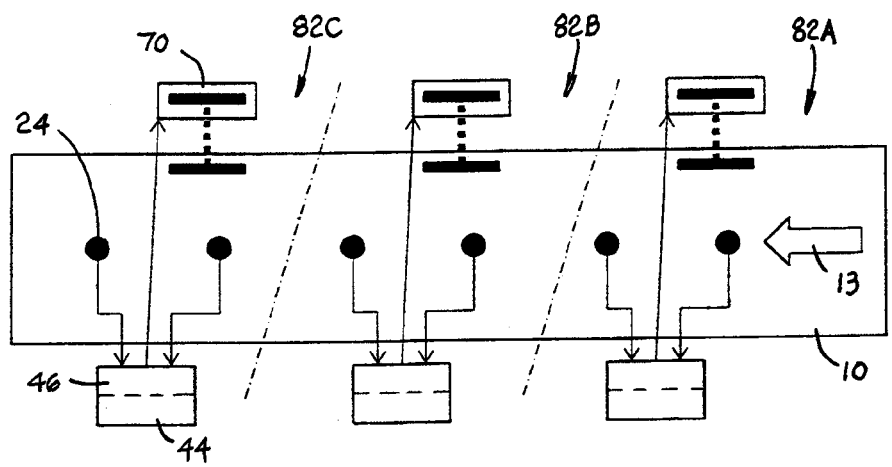
FIG. 11 is a top plan view of a conveyor system as in FIG. 1, further showing a plurality of controllers controlling the application of damping along the length of the conveyor system.

FIG. 11 shows a plurality of controllers 44 with receivers 46 distributed along the length of the conveyor at fixed locations in individual control zones 82A-C. As belt-borne accelerometers 24 come within communication range of a receiver, sensing in the receiver's zone is switched to the in-range accelerometer or accelerometers now local to that receiver. The controller coupled to that receiver uses the measurements of the local accelerometer or accelerometers in the receiver's zone to control an associated damper 70 in that zone in a closed-loop damping control system. As an accelerometer advances past the zone of one local receiver and into the next zone, it is passed off to the receiver and the controller in the next zone. The accelerometer then becomes local to the controller controlling the damping in the next zone downstream. This distributed control system is especially useful in long conveyors.

Although the invention has been described in detail with reference to exemplary versions, other versions are possible. For example, the damper control may be operated in an on/off or otherwise modulated fashion. And the damping can vary linearly or nonlinearly with belt speed. Although the distributed control system of FIG. 11 is described as using an individual controller in each zone, a single controller receiving data from the receivers in all the zones and controlling all the dampers could be used instead.

What is claimed is:

1. A conveyor system comprising:
   a conveyor including a conveyor belt conveying articles in a conveying direction along a conveying path;
   an accelerometer embedded in the conveyor belt to make measurements of accelerations of the conveyor belt in multiple directions including the conveying direction;
   a controller processing the measurements;
   a damper controlled by the controller to damp accelerations of the conveyor belt in the conveying direction in response to the measurements of the acceleration of the conveyor belt in the conveying direction.

2. A conveyor system as in claim 1 wherein the accelerometer is a two-axis accelerometer.

3. A conveyor system as in claim 1 wherein the accelerometer is a three-axis accelerometer.

4. A conveyor system as in claim 1 wherein the conveyor belt is a modular plastic conveyor belt.

5. A conveyor system as in claim 1 further comprising a transmitter embedded in the conveyor belt and a receiver external to the conveyor belt, wherein the transmitter transmits the measurements of accelerations made by the accelerometer to the receiver.

6. A conveyor system as in claim 1 wherein the damper is a linear damper applying a force against the conveyor belt to damp accelerations of the conveyor belt in the conveying direction.

7. A conveyor system as in claim 6 comprising a carryway supporting the conveyor belt and wherein the linear damper includes a movable pad facing the conveyor belt opposite the carryway, wherein the pad moves to clamp the conveyor belt against the carryway to damp accelerations in the conveying direction.

8. A conveyor system as in claim 6 wherein the conveyor belt includes magnetically attractive material, the conveyor system further comprising a carryway supporting the conveyor belt, and wherein the linear damper includes a magnet operated by the controller to attract the conveyor belt against the carryway to damp accelerations of the conveyor belt in the conveying direction.

9. A conveyor system as in claim 6 further comprising a carryway supporting the conveyor belt, wherein the carryway includes magnetically attractive material, and wherein the linear damper includes one or more magnets in the conveyor belt operated by the controller to attract the carryway against the conveyor belt to damp accelerations in the conveying direction.

10. A conveyor system as in claim 1 comprising a conveyor drive system supporting and driving the conveyor belt, wherein the drive system includes drive and idle shafts and wherein the damper is a rotational damper operative with at least one of the drive and idle shafts to damp accelerations of the conveyor belt in the conveying direction.

11. A conveyor system as in claim 1 wherein at least a portion of the conveyor belt is electrically conductive and wherein the damper includes a magnetic field generator that induces eddy currents in the electrically conductive portion of the conveyor belt to damp accelerations of the conveyor belt in the conveying direction.

12. A conveyor system as in claim 1 wherein at least a portion of the conveyor belt is made of a magnetically attractive material and wherein the damper includes a magnetic field generator that creates a magnetic field that opposes the motion of the conveyor belt in the conveying direction to damp accelerations of the conveyor belt in the conveying direction.

13. A conveyor system as in claim 1 wherein the damper includes a plurality of intermediate drives drivingly engaged with the conveyor belt at spaced apart positions along the conveyor.

14. A conveyor system as in claim 1 comprising a drive for controlling the speed of the conveyor belt in the conveying direction, wherein the controller adjusts the speed of the conveyor belt in response to the measurements of acceleration to damp accelerations of the conveyor belt in the conveying direction.

15. A conveyor system as in claim 1 wherein the damper is a rotational damper including an engaging element engaging the conveyor belt to convert the linear motion of the conveyor belt in the conveying direction to rotational motion.

16. A conveyor system as in claim 1 comprising a plurality of the accelerometers embedded in the conveyor belt at spaced apart positions, each making measurements of the local acceleration of the conveyor belt in multiple directions including the conveying direction.

17. A conveyor system as in claim 16 comprising a plurality of dampers disposed at fixed locations along the length of the conveying path in individual zones to locally damp accelerations in the speed of the conveyor belt in response to the measurements of local acceleration by one or more of the accelerometers passing through the zone.

18. A conveyor system as in claim 17 further comprising:
a plurality of receivers disposed at fixed locations along the conveying path, wherein each of the receivers resides in an associated one of the zones to receive acceleration measurements from accelerometers passing through the associated zone;
a plurality of controllers coupled to the receivers to receive the measurements of local acceleration made by the accelerometers passing through each of the zones and coupled to the dampers to control the damping of the conveyor belt in each zone.

19. A conveyor system as in claim 18 wherein, as one of the accelerometers passes from a first one of the zones into an adjacent second one of the zones, the at least one controller switches the accelerometer's measurement of local acceleration from association with the first zone to association with the second zone.

20. A method for measuring the acceleration of a conveyor belt, comprising:
driving a conveyor belt having at least one embedded accelerometer in a conveying direction along a conveyor carryway;
making measurements of the acceleration of the conveyor belt in multiple directions including the conveying direction with the at least one embedded accelerometer;
controlling the motion of the conveyor belt in the conveying direction in response to the measurements of the acceleration.

21. The method of claim 20 wherein making measurements of the acceleration comprises making the measurements at a plurality of embedded-accelerometer positions along the length of the conveyor belt.

22. The method of claim 20 wherein controlling the motion of the conveyor belt comprises damping the acceleration of the conveyor belt in the conveying direction in response to the measurements of the acceleration.

23. The method of claim 22 further comprising damping the acceleration of the conveyor belt in the conveying direction at a plurality of damping positions along the length of the conveyor.

24. The method of claim 20 wherein controlling the motion of the conveyor belt comprises adjusting the speed of the conveyor belt in response to the measurements of the acceleration in the conveying direction.

25. The method of claim 20 wherein controlling the motion of the conveyor belt comprises stopping the conveyor belt whenever the measurements of the acceleration exceed a predetermined level.

26. The method of claim 20 further comprising detecting the impact of an article dropped onto the conveyor belt from the measurements of acceleration.

27. The method of claim 20 wherein the conveyor belt is driven through a processing device and further comprising analyzing a failure trend of the processing device from the measurements of the acceleration of the conveyor belt.

* * * * *